Jan. 23, 1968  L. J. STOFFER ET AL  3,365,126
COMPRESSOR BLADE
Filed Sept. 1, 1965
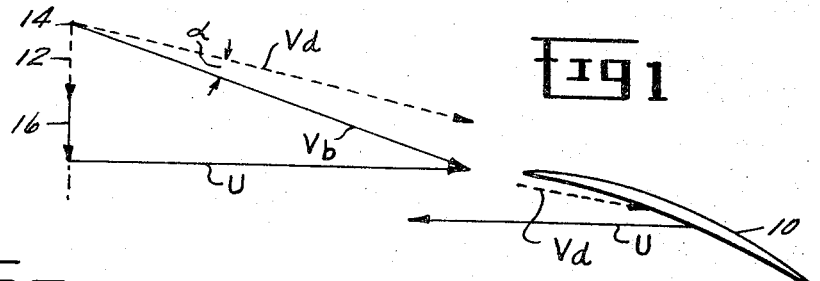
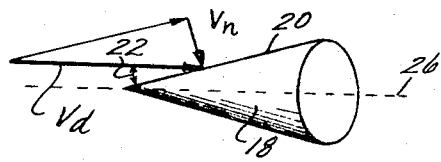
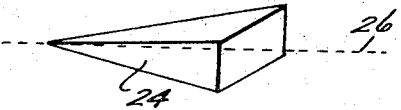
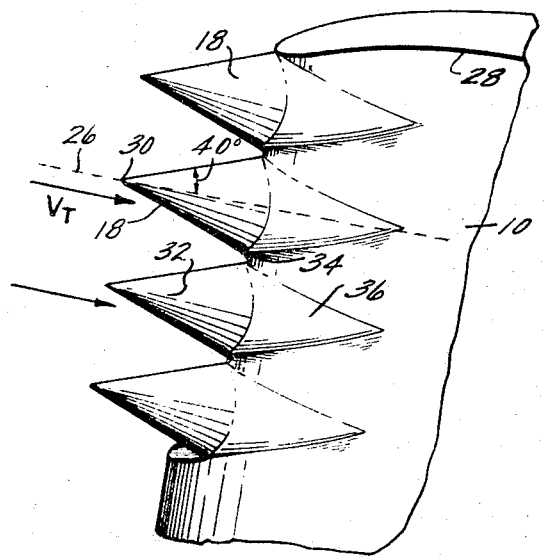
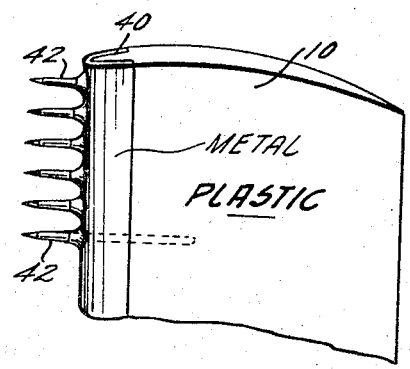
INVENTOR.
LEWIS J. STOFFER
JOHN R. ERWIN
BY
*John T. Cullen*
ATTORNEY—

United States Patent Office 3,365,126
Patented Jan. 23, 1968

3,365,126
COMPRESSOR BLADE
Lewis J. Stoffer and John R. Erwin, Cincinnati, Ohio, assignors to General Electric Company, a corporation of New York
Filed Sept. 1, 1965, Ser. No. 484,282
4 Claims. (Cl. 230—132)

ABSTRACT OF THE DISCLOSURE

The disclosure shows a compressor blade having serrations formed by a conical body which is substantially symmetrical about a center line parallel to the total flow of the concave surface, striking the blade and pointed towards the direction of the flow. The conical bodies have a maximum included angle and may be formed as needle-like projections from a metallic cap on the leading edge portion of a non-metallic blade.

---

The present invention discloses a compressor blade and, more particularly, a high speed compressor blade of cambered airfoil shape which has a particularly serrated formation on the leading edge to reduce erosion damage and improve aerodynamic efficiency.

A serious problem in transonic and supersonic compressors is the problem of rain, dust, or ice erosion. Any foreign material entering such high speed compressors tends to erode the blades. The erosion obviously destroys the aerodynamic efficiency of the blades. Additionally, when the velocity of the leading edge of the blade exceeds 1000 feet per second the rate of erosion increases very rapidly with straight leading edge blades. It has been found that above 1000 feet per second impact velocity metallic blades erode very rapidly and above 500 feet per second, the leading edge of plastic blades erodes rapidly. In an aircraft the forward motion is very high, so that the relative motion of rain drops entering the fan or engine inlet is also very high and equal to the relative velocity of the air at the inlet. As a result, the angle of the drops meeting the fan or compressor blades is nearly the same as the angle of the air. The result of the air carrying the foreign particles and striking the leading edge substantially at right angles is eroding or chipping away of the compressor blade.

The general problem of erosion of airfoils has been known for a long time. It has been a problem in steam turbines for many years and various arrangements have been devised to correct it. Typically, a serrated leading edge bucket has been proposed as shown for example, in U.S. Patent 1,862,827—Parsons which proposes sharp knife edges or points which in effect, slice up the water droplets into a fine spray and reduce the impact damage. In such an application, the steam inlet direction and the water inlet direction are substantially at right angles as shown in his FIGURE 2 and the serrations are so formed that the water strikes the convex bucket surface where the knife edges divide it into a fine spray to reduce the impact damage. Presently-used fan and front stage compressor blades for high speed aircraft use very sharp transonic and supersonic blade sections. Rain erosion tests have shown that the problems encountered in a steam turbine situation and the high speed compressor blade situation are quite different and the knife edge serrations of the prior art are not adequate in the high speed environment. Where the air and foreign particles enter substantially in the same direction relative to the blade at high speed, a substantially different configuration of serrations is required.

The main object of the invention is to provide a compressor blade with a serrated leading edge which drastically reduces the impact angle of the foreign objects striking the leading edge.

Another object is to provide such a blade wherein the aerodynamic efficiency is improved by the use of particularly designed leading edge serrations.

A further object is to provide such a blade which is designed to reduce the impact angle where the total flow is comprised of the airflow and foreign objects together entering the compressor blade substantially at the same angle.

A further object is to provide such a compressor blade wherein the impact angle of the total flow on the leading edge is never permitted to exceed 40° so that the blade leading edge has no surface exposed to the flow at an angle greater than 40°.

A final object is to provide such a compressor blade which employs serrations in a cone-like or pyramid-like specific shape directed into the total flow to reduce erosion damage and improve aerodynamic efficiency.

Briefly stated, the invention is directed to a high speed compressor blade of a cambered airfoil shape which has the conventional leading and trailing edges. The leading edge according to the invention is modified to include serrations and each serration comprises a body that is substantially symmetrical about a centerline that is parallel to the total flow, the total flow being made up of the airflow and the foreign objects and this total flow strikes the concave surface of the airfoil. The body comes to a point which is directed into the flow and then angles away in a cone-like or pyramid-like manner from the centerline in the downstream flow direction a maximum of 40° where it then fairs into the adjacent serrations. The result is the serrated leading edge of the blade has no surface that is exposed to the flow at an angle greater than 40°. The serrations may be disposed on part of the leading edge or on the total leading edge. In addition, the blade may be made of a non-metallic material, such as fiberglass, and the serrations may consist of needle-like metallic members embedded in the non-metallic material for cheaper and lightweight blades.

While the specification concludes with claims particularly pointing out and distinctly claiming the subject matter which is regarded as the invention, it is believed the invention will be better understood from the following description taken in connection with the accompanying drawings, in which:

FIGURE 1 is a vector diagram illustrating the velocities encountered by the structure of the invention;

FIGURE 2 is a detail view of one type of serration illustrating the vector requirements;

FIGURE 3 is a partial view of a modified serration;

FIGURE 4 is an enlarged view of a portion of the leading edge showing the serrations; and FIGURE 5 is a perspective view of a modified version employing dissimilar materials.

The invention is to be described as directed to compressor blades. This term is meant to encompass the normal rotor blades or stator vanes that are used in high-speed compressors or fans. In high-speed compressor blades wherein the leading edge velocity may be 500 feet per second and above, and which are used in axial flow aircraft compressors as an example, it is common to have high erosion of the blades due to rain, ice, hail, dust or salt spray or other objects. These are referred to herein as foreign objects and the invention will be described with respect to rain drops for convenience. When the velocity of the leading edge of the blade exceeds 1000 feet per second, the rate of erosion due to the rain drops increases rapidly.

Referring first to FIGURE 1, the above is explained vectorially. In this figure, a high speed cambered compressor blade of airfoil shape is shown at 10. It moves with absolute velocity U in the direction shown. If the compressor employing such a blade is in an aircraft flying through a rain squall, the absolute rain drop velocity entering the axial compressor is shown at dotted arrow 12 with its origin at 14. At the same time, the absolute higher air velocity entering the compressor is shown at arrow 16 having its origin at 14. Because of the high speed of the aircraft, and the blading in the compressor, these two absolute velocities generally coincide in direction as shown. If the blade or wheel velocity U is added to vector 16 the result is $V_b$ which is the velocity of the air relative to the compressor blade 10. If the same absolute wheel or blade velocity U is added to the absolute rain velocity 12 the resultant is $V_d$ which is the velocity of the rain drop relative to the compressor blade as shown. It will be seen that the total flow is made up of $V_b$ and $V_d$ and that these two velocities relative to the blade are entering substantially together. In other words, the angle alpha is very low—in the order of a few degrees. The result, as shown in FIGURE 1, is that the velocity of the rain drops relative to the blade $V_d$ strikes the concave surface of the blading as does the air velocity relative to the blade $V_b$. The figure shows $V_d$ moved down parallel to itself in the vector diagram and contacting blade 10 on the concave surface. The purpose of this diagram is to illustrate how the total flow that is made up in two parts of the air and the rain drops enters in substantially the same direction as opposed to the wide angular variation that is encountered in a different environment as, for example, shown in FIGURE 2 of the above-referenced patent.

As a result of the different environment encountered, it has been found that the serrated knife edges will not handle the erosion problem in the high-speed compressor blades herein. Because of the different entering directions of the rain drops a completely different serrated edge construction is required and the knife edges of the prior art will not solve the problem in high-speed compressor blades.

The main object in high-speed compressor blades is to drastically reduce the impact angle of the rain drops or foreign particles that strike the blade surface. Referring next to FIGURE 2, an individual serration 18 is shown in the form of a cone-like member and the velocity of the rain drops relative to the blading is again shown as $V_d$. This is the same vector from FIGURE 1. If this vector is resolved into its component normal to the surface 20 of the serrations it will be apparent that $V_n$ is small. This $V_n$ is the component that does the damage and the eroding. Obviously, maintaining this as small as possible will reduce the erosion. It has been found that this may be maintained within tolerable limits if the impact angle 22 between the surface 20 of the serration and the relative velocity of the rain drops $V_d$ is maintained at 40° or less. Similar results are obtained if the cone-like serration 18 is in the form of a pyramid-like serration 24. Favorable erosion resistance is obtained by any shape, regular or irregular, between 18 and 24.

Thus, the individual serrations must be of the general shapes shown in FIGURES 2 and 3, namely, the cone-like shape 18 varying into the pyramid-like shape 24 or anything in between.

Referring next to FIGURE 4, there is shown a general partial leading edge serrated blade formation which, for convenience, is shown as the cone-like member 18. This member then comprises a body 18 that is substantially symmetrical about a centerline 26 that is parallel to the total flow $V_t$ as explained in FIGURE 1. This total flow, as shown in FIGURE 4 by the arrow $V_t$ strikes the concave surface 28 of the compressor blade 10. Thus, each serration has a point 30 that is directed into the flow and the body 18 angles away from the centerline 26 in a downstream direction. To maintain the impact angle at a minimum, the body angles away from centerline 26 a maximum of 40° as shown in FIGURE 4. Adjacent serration 32 and serration 18 fair into one another at the saddle shaped base 34 thereof and into the blade 10 in a suitable reversed portion 36 with the result that the leading edge surface generally indicated at 38 has no surface exposed to the total flow at an angle greater than 40°.

In addition to the reduction of erosion problems on the leading edge of compressor blades in the transonic and supersonic compressors by the specific serrations just described, a significant reduction in the areodynamic loss coefficient is obtained with these serrations as compared to the conventional straight sharp leading edge of such compressor blades. This appears to occur because of a modification of the blade boundary layer. In a normal smooth straight leading edge blade it is well known that a laminar boundary layer will separate easily when, at supersonic velocities, even a weak shock wave strikes the surface of the blade. The laminar boundary layer separates at the point on the blade where the shock wave strikes the surface of the blade. A turbulent boundary layer on the other hand, can sustain much stronger shock waves without flow separation. The boundary layer thickness and the losses that are normally produced in a straight edge blade traveling at supersonic velocities are greatly reduced in the presence of the turbulent boundary layer which is set up by the serrations above described. Thus, the disclosed particular serrations in the environment of the compressor blading at high velocities, not only dramatically reduces the erosion damage but also provides a significant reduction in the loss coefficient and the aerodynamic efficiency is thereby improved.

The use of metallic blading does not encounter difficulties from erosion damage until about 1000 feet per second velocities are attained. Above that, erosion is rapid. It is desirable to use non-metallic material where possible for light weight and various plastics such as fiberglass have been used. However, while these are very strong in tension they are very weak in impact and erosion resistance. Such material is subject to rapid erosion above 500 feet per second. Because of the cheapness of the material and the light weight characteristics of such non-metallic material, it is desirable to use it where possible. To this end, as shown in FIGURE 5, the serrated leading edge of the type disclosed lends itself to a combination blade where the entire blade 10 may be plastic and have a leading edge portion 40 of a metallic cap for additional erosion resistance. The leading edge portion 40 may have the serrations extending through it in the form of needle-like members 42 to withstand the impact of the foreign objects. Each of the members 42 is substantially identical to those described in FIGURE 2 and preferably are metallic and embedded in the plastic as shown dotted.

Inasmuch as the compressor blading may, depending on its length and environment, operate subsonically and supersonically, it may be necessary to have serrations only on a portion of the leading edge. Generally, this may be required, in the case of a rotating blade, on the outer radial portion as shown in FIGURE 5 which moves at a higher velocity than the inner portion. Alternately, the serrations may extend over the full extent of the leading edge of the blades.

A compressor blade constructed as described with the particular serrations is highly erosion resistant and aerodynamically efficient. It is only applicable in the high speed range wherein the total flow is approaching substantially in one direction and, as a result, a particular serration configuration is required to reduce the impact angle and make it as small as possible. The knife edges of the prior art will not operate in the environment of the compressor blade nor are they so intended. Because of the incident flow of the air and drops being substantially together, the particular serrated shape is critical to reduce the angle of impact. The cone-like and pyramid-like shapes also provide a substantial body of material downstream of the point for strength since the serrations are subject to impact of foreign objects.

While there have been described preferred forms of the invention obvious equivalent variations are possible in light of the above teachings. It is therefore to be understood that within the scope of the appended claims, the invention may be practiced otherwise than as specifically described, and the claims are intended to cover such equivalent variations.

What is claimed is:
1. A high-speed compressor blade of cambered airfoil shape having a leading and trailing edge,
said leading edge including serrations thereon, each serration comprising:
a cone-like body substantially symmetrical about a centerline parallel to the total flow striking the concave surface and having a point directed into the flow,
said body angling away from the centerline in a downstream flow direction a maximum of 40° to fair into the adjacent serration,
whereby said blade serrated leading edge has no surface exposed to the flow at an angle greater than 40°.
2. A blade as described in claim 1 wherein the blade is non-metallic and the leading edge of said blade is a metallic material and said serrations consist of needle-like members embedded in said blade.
3. A blade as described in claim 2 wherein said serrations are disposed on a portion of the leading edge of said blade.
4. A blade as described in claim 2 wherein said serrations extend over the full extent of the leading edge of said blades.

References Cited

UNITED STATES PATENTS

| | | |
|---|---|---|
| 978,677 | 12/1910 | Taylor. |
| 1,446,011 | 2/1923 | Jackson. |
| 1,712,119 | 5/1929 | Ray. |
| 1,862,827 | 6/1932 | Parsons _____ 230—134 |
| 1,864,260 | 6/1932 | Squires. |
| 1,872,749 | 8/1932 | Karageorge. |
| 1,943,934 | 1/1934 | Telfer. |
| 2,355,413 | 8/1944 | Bloomberg. |
| 2,738,950 | 3/1956 | Price. |
| 3,012,709 | 12/1961 | Schnell. |

HENRY F. RADUAZO, *Primary Examiner.*

SAMUEL FEINBERG, *Assistant Examiner.*